United States Patent [19]

Kamise et al.

[11] Patent Number: 4,858,580
[45] Date of Patent: Aug. 22, 1989

[54] KNOCKING CONTROL SYSTEM FOR INTERNAL COMBUSTION ENGINE

[75] Inventors: Katsuya Kamise; Shigeru Yamamoto, both of Hiroshima, Japan

[73] Assignee: Mazda Motor Corporation, Hiroshima, Japan

[21] Appl. No.: 198,745

[22] Filed: May 25, 1988

[30] Foreign Application Priority Data

May 28, 1987 [JP] Japan .................. 62-129912

[51] Int. Cl.⁴ .................. F02P 5/15; F02P 11/00
[52] U.S. Cl. .................. 123/425
[58] Field of Search .......... 123/425, 435, 479; 60/602, 611; 73/35; 364/431.08, 431.11

[56] References Cited

U.S. PATENT DOCUMENTS

| | | | |
|---|---|---|---|
| 4,387,571 | 6/1983 | Katsumata et al. | 60/602 |
| 4,690,116 | 9/1987 | Takahashi | 123/425 |
| 4,694,800 | 9/1987 | Morita | 123/425 |
| 4,708,113 | 11/1987 | Harada et al. | 123/425 |
| 4,711,215 | 12/1987 | Cinpinski | 123/425 |
| 4,729,358 | 3/1988 | Morita et al. | 123/425 |
| 4,736,323 | 4/1988 | Utsumi et al. | 123/425 |
| 4,748,952 | 6/1988 | Yagi et al. | 123/425 |
| 4,760,828 | 8/1988 | Shimada et al. | 123/425 |
| 4,766,545 | 8/1988 | Nagai | 123/425 |

FOREIGN PATENT DOCUMENTS

| | | | |
|---|---|---|---|
| 58-167881 | 10/1983 | Japan | 123/425 |
| 60-75730 | 4/1985 | Japan | 123/425 |
| 61-16239 | 1/1986 | Japan | 123/425 |

Primary Examiner—Raymond A. Nelli
Attorney, Agent, or Firm—Fleit, Jacobson, Cohn, Price, Holman & Stern

[57] ABSTRACT

A knocking control system for an internal combustion engine comprising knocking detector for detector an occurrence of a knocking, first control element for controlling a combustion in an engine combustion chamber based on signals from the knocking detector, first knocking suppressing device for determining a first control gain to control the first control element and thereby suppressing a knocking, second control element for controlling the combustion in the combustion chamber, second knocking suppressing element for determining a second control gain and for controlling the second control element when the first control gain for the first control element is more than a predetermined value, and gain changing element for changing the first control gain to a smaller value as the second control gain is increased. The control system performs quicker knocking control by the first and second control element.

11 Claims, 6 Drawing Sheets

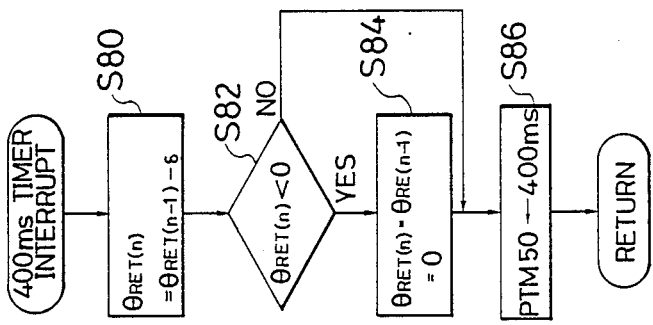
FIG. 3D
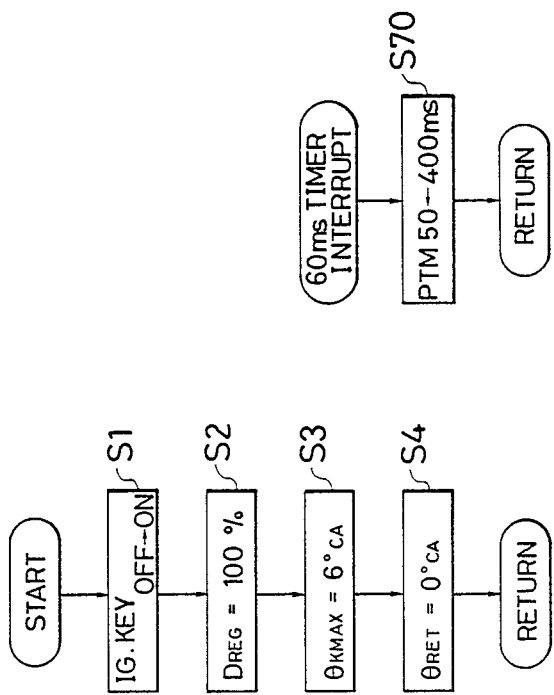
FIG. 3C
FIG. 3A

| PULSE NUMBER | 0 | 2 | 4 | 6 | 8 | 10 | 12 | 14 | 16 | 18 | 20 |
|---|---|---|---|---|---|---|---|---|---|---|---|
| $\theta_{RET}$ | 0 | 1 | 1.9 | 2.8 | 3.8 | 4.7 | 5.6 | 6 | 6 | 6 | 6 |

FIG.4

| DUTY RATIO | $\theta_{KMAX}$ |
|---|---|
| 100 | 6 |
| 75 | 5 |
| 50 | 4 |
| 25 | 3 |
| 0 | |

FIG.5

KNOCKING CONTROL SYSTEM FOR INTERNAL COMBUSTION ENGINE

BACKGROUND OF THE INVENTION

1. Field of the invention

The present invention relates to a knocking control system for an internal combustion engine, more specifically to a knocking control in response to an octane number of a fuel for the engine.

2. Description of the Prior Art

There have been proposed various controls for controlling an ignition timing, air-fuel ratio, supercharging pressure of intake air, compression ratio, and the like so as to suppress the knocking which is apt to cause engine troubles.

In U.S. Pat. No. 4,387,571, there is disclosed a knock control in which the supercharging pressure for intake air is changed in accordance with the frequency of the knocking occurrence. Japanese patent public disclosure No. 58-167881 laid open to the public on Oct. 4, 1983 discloses a knock control in which when the retard amount of the ignition timing is more than a predetermined value, the supercharging pressure is reduced. Further, Japanese patent public disclosure No. 61-16239 laid open to the public on Jan. 24, 1986 discloses a knock control in which the supercharging pressure is determined based on the ignition timing compensated in accordance with the knocking occurrence.

There has also been proposed an engine which is available for different octane number of fuels. The octane number of the fuel affects an occurrence of the knocking so that the knocking control is necessary to be changed in accordance with the octane number of the fuel.

In the above type of engine to which different octane number of fuels are supplied as disclosed in Japanese patent public disclosure No. 60-75730, which is laid open to the public on Apr. 30, 1985, the knocking is detected by detecting an engine vibration and the like so that the octane number of the fuel supplied to the engine is judged from the occurrence of the knocking and the ignition timing is controlled in accordance with the octane number wherein the ignition timing is retarded as the number of the knocking occurrence is increased. In this control, at first the ignition timing is set for a high-octane fuel. And, when a knocking occurs, the ignition timing is retarded. Even when the ignition timing is retarded by a certain time and the knocking is not eliminated, it is judged that the fuel is not a high-octane fuel not a regular fuel. In addition, in the knocking control disclosed in the above Japanese application, a supercharging pressure is reduced when the fuel is judged as a regular gasoline.

Therefore, once the octane number is judged and the ignition timing is set, the timing is usually maintained until the engine is stopped because it is unlikely to change the octane number of the fuel during a running of a vehicle. Therefore, where the judgment of the octane number is not correct, the ignition timing could not be set properly.

It should be noted thhat a knocking sensor is apt to pick up a noise other than a noise signal denoting a knocking and that such mis-judgment of the octane number is likely to happen. Under these circumstances, in order to judge the octane number of the fuel correctly using such knocking sensor, it is necessary to set the ignition timing with a substantial delay time enough to distinguish one another. However, as the delay time in the ignition timing is increased, it takes more time to reach the set ignition timing through the knocking control. When the ignition timing attains to the set value and the knocking is not eliminated, the supercharging pressure is reduced. Nevertheless, where the knocking is not eliminated, the control is necessary to be continued repeatedly. This means that the knocking control is less responsive. As a result, it takes a long time to obtain a proper ignition timing so that the knocking occurs continuously to cause troubles such as an increase of an exhaust gas temperature.

In the knocking control aforementioned, although the ignition timing and supercharging pressure are utilized for judging the octane number of the fuel and for eliminating the knocking, the knocking control results in the same even when the other factors such as air fuel ratio are employed for judging the octane number of the fuel and for suppressing the knocking.

As aforementioned the above knocking control is disadvantageous in that the judgment of the fuel octane number takes long to deteriorate an engine output and fuel consumption efficiency.

SUMMARY OF THE INVENTION

It is therefore object of the present invention to provide a knocking control system which can suppress a knocking in accordance with an octane number of the fuel effectively.

It is another object of the present invention to provide a knocking control system for an internal combustion engine which can set an optimum condition for an engine operation so as to eliminate an occurrence of knocking in accordance with an octane number of the fuel for the engine.

It is further object of the present invention to provide a knocking control system which can set an optimum control condition for an engine operation in order to suppress a knocking quickly.

According to the present invention, there is provided a knocking control system for an internal combustion engine comprising knocking detecting means for detecting an occurrence of a knocking, first control means for controlling a combustion in an engine combustion chamber based on signals from the knocking detecting means, first knocking suppressing means for determining a first control gain to control the first control means and thereby suppressing a knocking, second control means for controlling the combustion in the combustion chamber, second knocking suppressing means for determining a second control gain and for controlling the second control means when the first control gain for the first control means is more than a predetermined value, and gain changing means for changing the first control gain to a smaller value as the second control gain is increased.

In the above control system, there are provided two control means for controlling the engine combustion. And the first control gain set by the first control means is adapted to be reduced in relation to a value of the second control gain set by the second control means. Therefore, even where the knocking detecting means fail to detect an occurrence of the knocking correctly, the mis-judgment can be corrected as soon as possible. In this connection, the first control gain can be set at a substantial value enough to distinguish other noise. This means that the reliability of the knocking detecting means can be improved. As a result, the knocking control according to the present invention can provide an optimum condition for the engine operation to suppress the occurrence of the knocking quickly irrespective of the octane number of the fuel so that the engine can be maintained at a desirable operating condition in an output property, fuel consumption efficiency and the like.

The above and other objects and features of the present invention will be apparent from the following description by taking reference with accompanying drawings employed for a preferred embodiment of the present invention.

BRIEF DESCRIPTION OF THE DRAWINGS

FIGS. 3A-3D are flow charts which show a procedure of a knocking control in accordance with the present invention;

FIG. 4 is a table showing a relationship between a retard amount of the ignition timing and frequency of occurrence of the knocking;

FIG. 5 is a table showing a supercharging pressure and the retard amount of the ignition timing;

DESCRIPTION OF PREFERRED EMBODIMENTS

Figure 1:
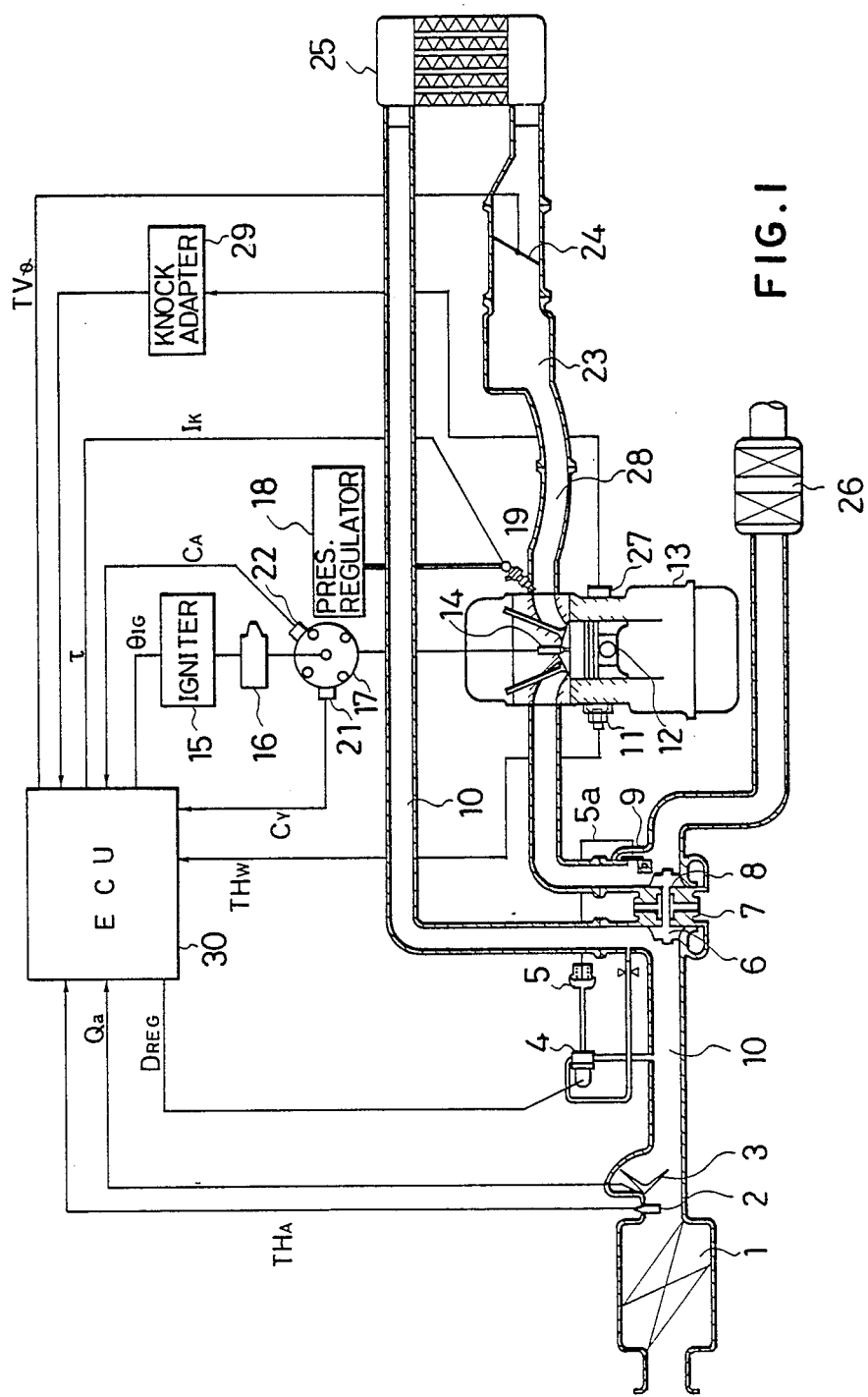
FIG. 1 is a schematic view of an engine provided with a knocking control system in accordance with the present invention.

Referring to FIG. 1, an engine control system comprises an engine 13, an ignition plug 14 for each cylinder, a supercharger S including an air compressor 6 and a turbine 8, and an engine controller 30.

An intake air system includes an air cleaner 1, a thermometer 2 for detecting an intake air temperature, and an air flow meter 3 for measuring the amount of the intake air mounted on an intake pasage 10. In addition, the intake air system is provided with the air compressor 6 for compressing the intake air, an intercooler 25 for cooling the intake air, a throttle valve 24, a surge tank 23, and an intake manifold 28. The intake air is introduced into a combustion chamber of the engine 13 through the above devices.

A fuel supply system includes a pressure regulator 18 for adjusting a fuel pressure, and an injector 19 mounted on the intake passage 10 for injecting the fuel. The injection period is defined by a signal $\tau$ from the engine controller 30. An exhaust system is provided with an exhaust manifold 28, the turbine 8 and a catalytic converter 26. The exhaust gas rotates the turbine 8 during passing therethrough.

A ignition timing control mechanism is provided with a distributor 17 including a crank angle sensor 22 and a cylinder discriminating sensor 21. Signals $C_A$ and $C_Y$ from the sensor 22 and 21 are introduced to the controller 30. There is provided a knocking sensor 27 for detecting an engine vibration and producing a signal denoting the vibration as a voltage signal which is introduced to a knocking adapter 29. The knocking adapter produces a knocking signal $I_K$ denoting a knocking. The signal $I_K$ is fed to the controller 30. The controller 30 calculates an ignition timing and produces a signal $\theta_{IG}$ therefor. The signal $\theta_{IG}$ is supplied to a igniter 15 to be amplified and thereafter to be introduced to the ignition plug 14 through the ignition coil 16 and the distributor 17.

The knocking adapter 29 picks up signals of a predetermined range of frequency (for example, 5 $KH_Z$–10 $KH_Z$) retarding to the knocking from outputs of the sensor 27 by means of a band pass filter and takes the average of them through a RC circuit. Then the adapter 29 compares the average signal with a reference signal which is obtained by increasing the number by certain times of a gain defined based on an engine speed. The difference between the average and the reference is integrated to make the knocking signal $I_K$.

It will be understood that as the occurrence of the knocking is increased, the maximum value of the knocking signal $I_K$ become big. The controller 30 detects the frequency of the occurrence of the knocking by making A/D conversion of the signal $I_K$.

A thermometer 11 is provided for detecting an engine temperature. The thermometer 11 products a signal $TH_W$. Signals THV denoting an opening of the throttle valve is also introduced to the controller 30.

A supercharging pressure control system is provided with a solenoid 4 for controlling a three way valve, a diaphragm device 5, one of which chamber is communicated with the valve, an actuator 5a controlled by the diaphragm device 5 and a waste gate valve 9 operated through the actuator 5a.

The controller 30 provides the solenoid 4 with a duty ratio signal $D_{REG}$ to control the opening of the three way valve and thereby control a negative pressure applied to the diaphragm 5. When the negative pressure is increased, the diaphragm opens the waste gate valve 9 through the actuator 5a so that a supercharging pressure introduced to the combustion chamber is controlled. For instance, when the duty ratio changes from 0% to 100% in response to a value of the signal $D_{REG}$, the supercharging pressure changes from the minimum (approximately 300 mmHg) to the maximum (approximately 380 mmHg).

Figure 2:
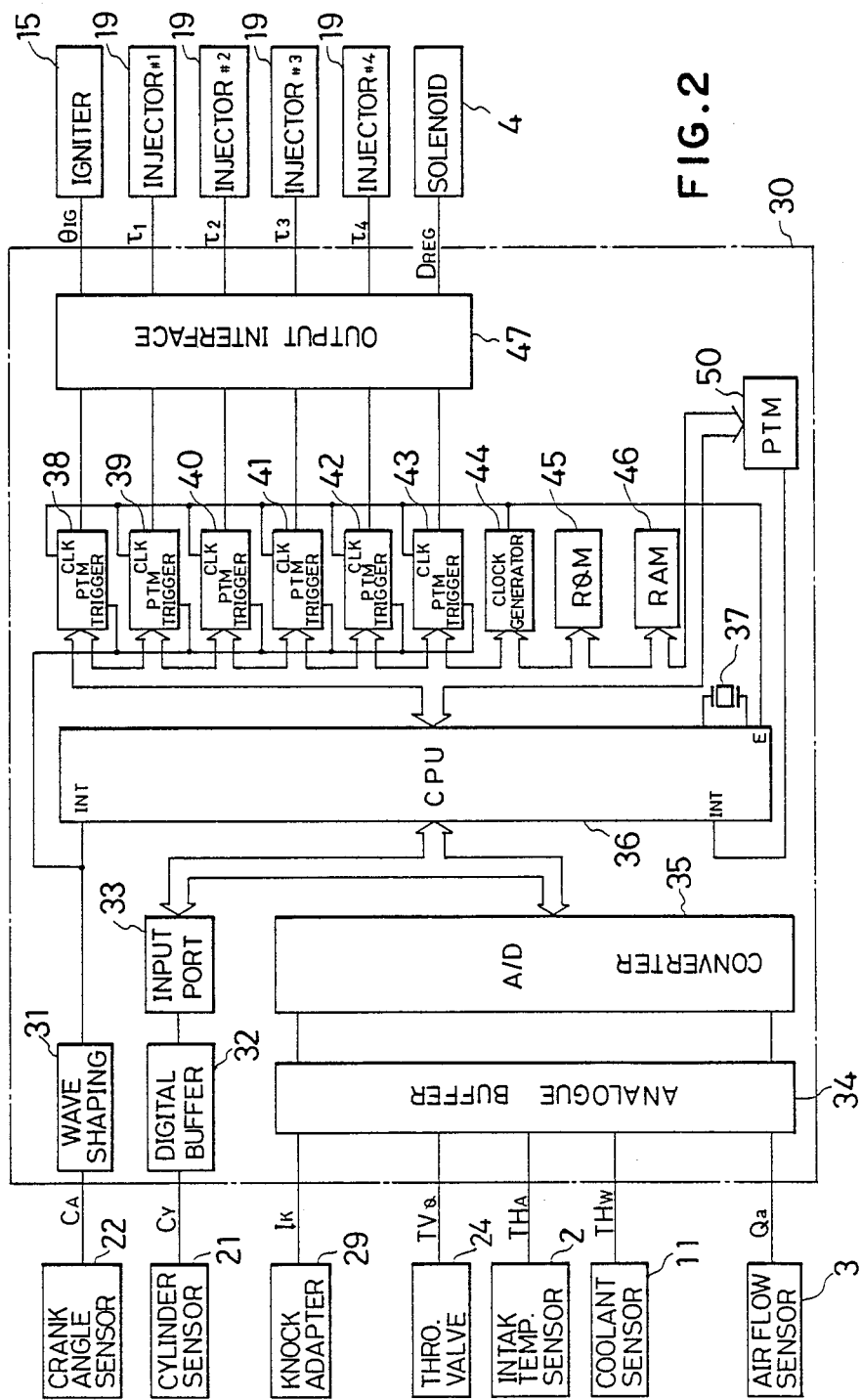
FIG. 2 is a view showing a constitution of a electronic controller in accordance with the present invention.

Hereinafter there is described a constitution of the controller 30 taking reference with FIG. 2.

The controller 30 is provided with a wave shaping element 31, a digital buffer 32, an input port element 33, an analogue buffer 34, an A/D converter 35, a central processing unit (CPU) 36, programmable timers 38–43, a clock signal generator 44, a read only memory (ROM) 45, a random access memory (RAM) 46, a programmable timer 50, and an output interface 47. The crank angle signal $C_A$ from the crank angle sensor 22 is fed to the CPU 36 through the wave shaping element 31. The signal $C_A$ is produced at each engine cycle. When the signal $C_A$ is introduced into the CPU 36, an interrupting routine is carried out wherein the amount of the fuel injection, a frequency of the knocking occurrence, a retard time in the ignition timing and the like are calculated.

The signals $C_Y$ from the cylinder sensor 21 are also introduced into the CPU 36 through the digital buffer 32 and the input port element 33. The CPU 36 receives the signal $C_Y$ at each time when the crank angle signal $C_A$ is produced, and specifies which cylinder should be ignited next. Analogue signals such as knocking signal $I_K$ from the knocking adapter 29, throttle valve opening signal TVO from the throttle valve 3, intake air temperature signal $TH_A$ from the sensor 2, engine temperature signal $TH_W$ from the sensor 11 and signal $Q_A$ from the air flow sensor 3 are introduced into the A/D converter 35 through the analogue buffer 34 to be converted to a digital value and thereafter to the CPU 36.

PTM 38–43 are programmable timers in which ignition timings $\theta_1$–$\theta_4$ for each of four cylinders, injection pulses $\tau_1$–$\tau_4$ and a duty ratio signal $D_{REG}$ for the solenoid 4. Clock signals are produced by a clock generator 44 and introduced into the PTM 38–43. The cycle of the clock signals are changeable by the CPU 36. The CPU 36 produces signals "0" or "1" for a certain period which is set in accordance with the crank angle signal $C_A$.

The output interface 47 includes a driver element for actuating the solenoid 4 and the like and produces amplified signals for respective driver elements 15, 19, and 4. The ROM 45 is provided for storing programs as shown in FIG. 3A–3D as flow charts. The RAM is provided for storing intermediate data temporarily.

The PTM 50 is used for detecting a period in which the knocking does not occur.

CONTROL

Referring to FIG. 3A–3D, there are provided interrupting routines which are carried out each when the crank angle signal $C_A$ is produced.

There is shown in FIG. 3A an initializing routine in which when an ignition key is on in step S1, the routine initializes to provide the duty ratio signal $D_{REG}$ with 100% in step S2, the maximum amount of retard $\theta_{KMAX}$ in the ignition timing $\theta_{RET}$ with 6° in step S3, and the retard amount $\theta_{RET}$ with $0\phi$ in step S4. It should be noted that the duty ratio $D_{REG}$ is set at 100% to facilitate the occurrence of the knocking to thereby figure out an octane number of the fuel. It will be considered that when the retard amount of the ignition timing $\theta_{REG}$ exceeds the maximum retard timing $\theta_{KMAX}$, the value of the retard amount of the timing $\theta_{REG}$ is not proper. Therefore, in the illustrated embodiment, the initial value of the maximum retard amount in the ignition timing is set at a relatively big value like $6\phi$ to prevent the noise sensor 27 from misjudging the knocking because the sensor is apt to pick up noises other than the knocking.

Hereinafter there is described a control for setting proper engine control factors in response to an octane number when the fuel is a regular gasoline.

Figure 3B:
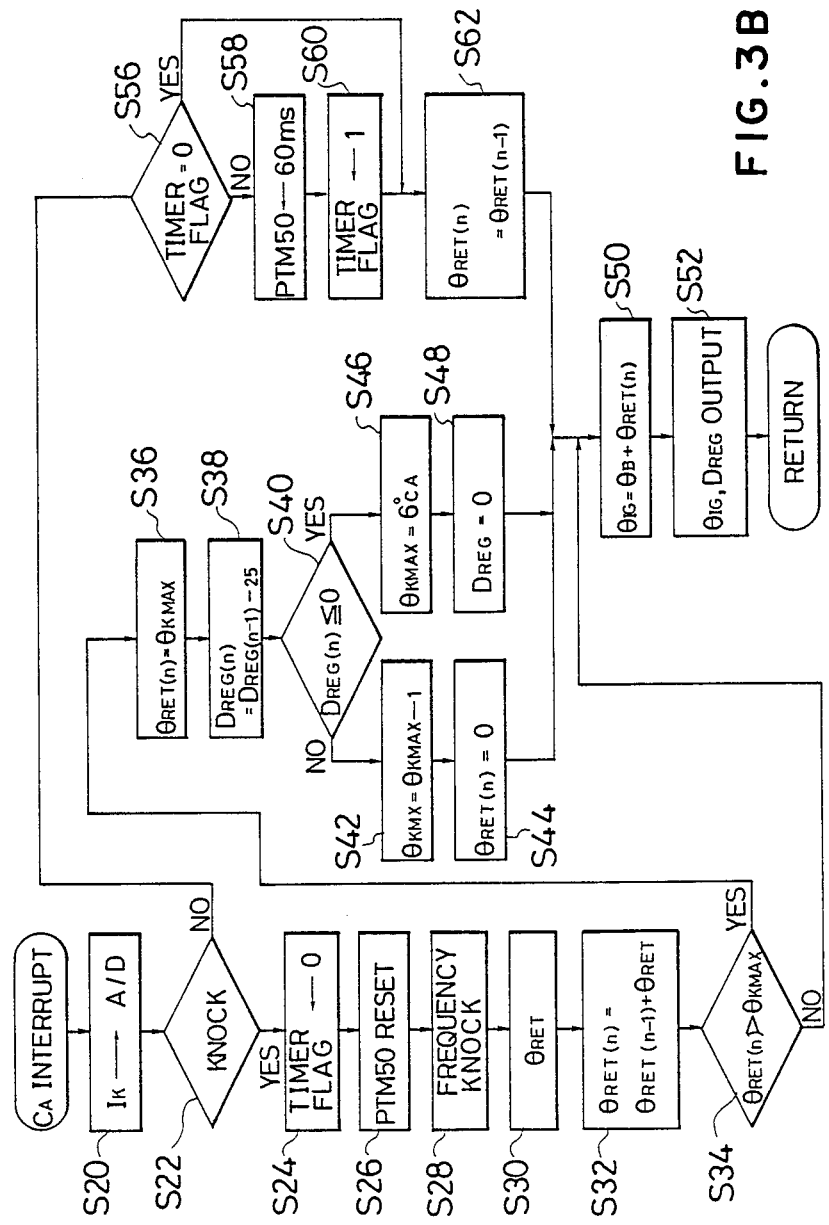

According to FIG. 3B, the CPU reads a knocking signal $C_A$ after making A/D conversion in the RAM 46 in step S20. In step S22, the controller 30 judges whether or not a knocking occurs. According to the present embodiment, the initial supercharged pressure is maximized so that a knocking occurs. Where a knocking occurs, the controller 30 goes to step S24 from step S22.

When the judgment is YES, or when a knocking occurs, the controller 30 resets a timer flag for the PTM 50 which counts the time of no-knocking occurrence in step S24. Thereafter, the controller 30 clears the PTM 50 in step 26. In step 28, the controller 30 counts the number of the knocking pulse. As aforementioned, since the knocking pulse number is converted to a digital value through the A/D converter 35, the controller 30 gets a retard amount of the ignition timing $\theta_{RET}$ in view of a table as shown in FIG. 3 which is stored in the ROM 45. In step S32, the controller 30 adds up the retard amount $\theta_{RET}$ and stores it in the RAM 45. It should be noted that a retard amount $\theta_{RET}(n-1)$ denotes a value which is stored in the RAM 45 at the preceding calculating cycle and that the retard amount $\theta_{RET}(n)$ denotes a value in the RAM in the present calculating cycle. Both the values $\theta_{RET}(n-1)$ and $\theta_{RET}(n)$ are zero at the fist calculating cycle in the routine.

In step S34, the controller 30 checks whether or not the value $\theta_{RET}(n)$ exceeds the upper limit $\theta_{KMAX}$. In the first calculating cycle, the judgment is $\theta_{RET}(n) < \theta_{KMAX}$ so that the controller 30 carries out step S50. In step S50, the controller 30 calculates an ignition timing $\theta_{IG}$ based on values $\theta_B$ and $\theta_{RET}$ wherein the value $\theta_B$ is a basic ignition timing which is set in accordance with an engine speed. Thereafter, the controller 30 causes the PTM 38 to set the value $\theta_{IG}$ therein so that the igniter 15 allows the current to be introduced to the ignition plug 14 at the set timing. Before the judgment in the step S52 satisfies a relation of $\theta_{RET}(n) > \theta_{KMAX}$ the controller 30 carries out the above procedure repeatedly each time when the interruption of the crank angle signal $C_A$ occurs.

Figure 6:
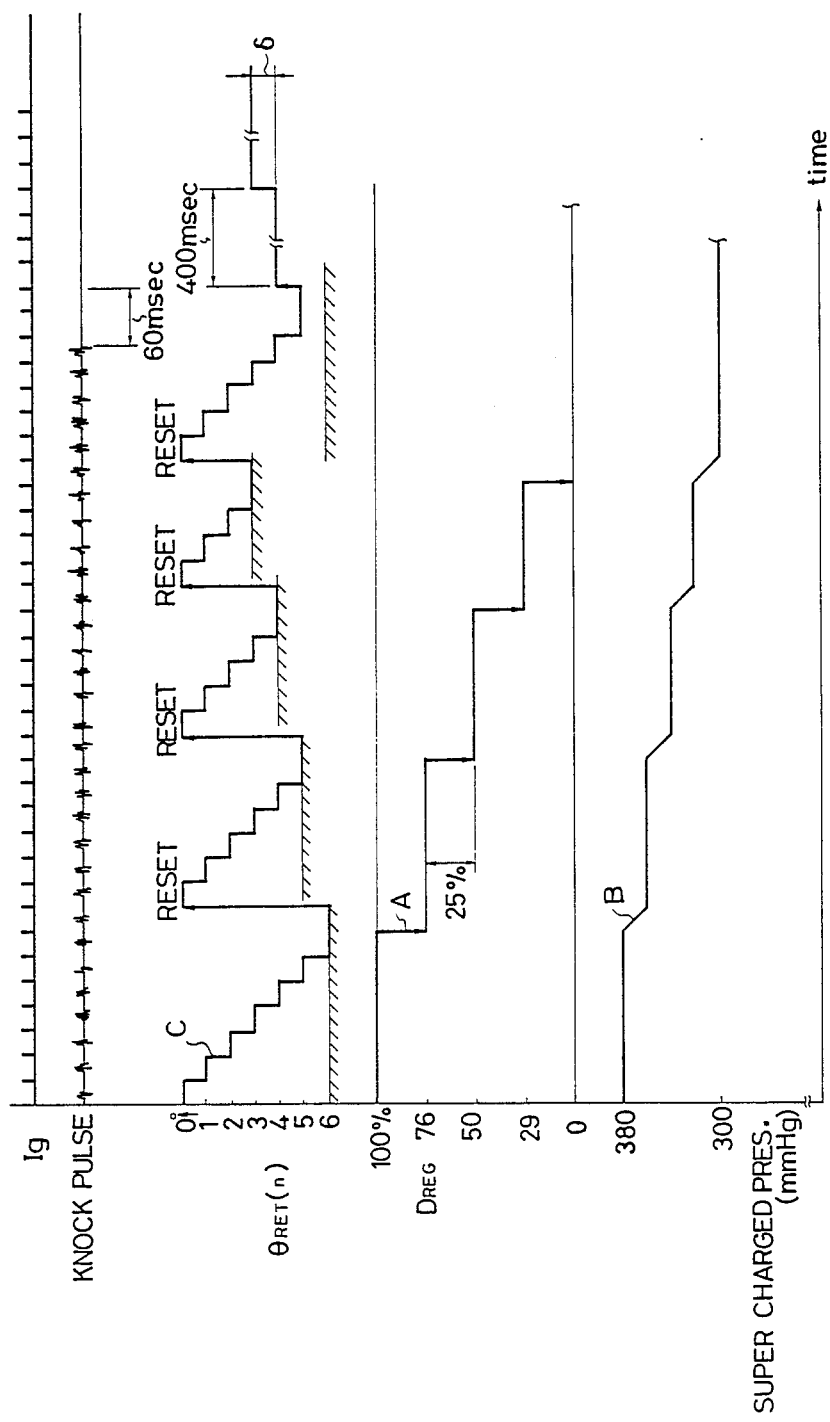
FIG. 6 is a timing chart showing changes in the variables in connection with the knocking control in accordance with the present invention.

Since the intake air is controlled to have the maximum value at the initial stage of the control, thhe knocking occurs continuously so that the retard amount of the ignition timing $\theta_{RET}$ is increased as shown in FIG. 6. Eventually, the judgment in the step S34 will satisfy a relationship of $\theta_{RET}(n) > \theta_{KMAX}$. In this case, the controller 30 carries out step S36 and reset the retard amount $\theta_{RET}(n)$ at the value $\theta_{KMAX}$ so that the value $\theta_{RET}$ cannot exceed the value $\theta_{KMAX}$. In step S38, the controller 30 reduces the duty ratio $D_{REG}$ by 25% to lower the supercharging pressure of the intake air. In step S40, the controller 30 checks the duty ratio $D_{REG}$ not to be reduced to a negative value. Then the controller 30 reduces the upper limit value of retard amount $\theta_{RET}$ or the value $\theta_{KMAX}$ by 1° in step S42. In next step S44, the controller 30 sets the values $\theta_{RET}(n)$ and $\theta_{RET}(n-1)$ at zero. Thereafter, the controller 30 carries out step S50 and S52 to provide the PTM 38 with the ignition timing $\theta_{IG}$. In this stage, since the supercharging pressure is reduced, the occurrence of the knocking is suppressed in comparison with the initial stage even when the value $\theta_{RET}(n)$ is zero. As shown by line A in FIG. 6, the duty ratio $D_{REG}$ is reduced by 25% each when the retard amount $\theta_{RET}(n)$ exceeds the maximum value $\theta_{KMAX}$. As a result, the supercharging pressure of the intake air changes as shown by a line B in FIG. 6. And each when the duty ratio $D_{REG}$ is changed, the retard amount $\theta_{RET}$ is reset as shown by a line C in FIG. 6 as long as the knocking occurs.

According to the above control in the ignition timing, the maximum value $\theta_{KMAX}$ is reduced when the retard amount $\theta_{RET}$ is reset so that a proper engine setting, that is, the ignition timing and supercharging pressure can be obtained for suppressing the knocking promptly in response to an octane number of the fuel as shown in FIG. 5 and 6.

When the engine setting is controlled to fit to the octane number of the fuel, the occurrence of the knocking is stopped. In this case, the controller 30 goes from step S22 to S56.

In step S56, the controller 30 judges whether or not the timer flag is reset, that is, the value is zero. If the judgment is YES, the controller 30 provides the PTM 50 with 60 ms as an initial value. Then in step S60, the controller 30 sets the timer flag. In step S62, the preceding retard amount $\theta_{RET}(n-1)$ is stored as the present retard amount $\theta_{RET}(n)$. This is because it is not necessary to change the retard amount $\theta_{RET}$ as far as the knocking does not occur. The controller 30 calculates the ignition timing $\theta_{IG}$ and outputs the signals for igniting the plug 14 and for controlling the solenoid 4 in step S50, and S52.

In the cased where the knocking occurs before the PTM 50 is out, the timer flag is reset in step S24 and the TPM 50 is cleared in step S26.

On the other hand, when the timer PTM 50 is out without an occurrence of the knocking, the controller 30 carries out step S70 in an interrupting routine shown in FIG. 3C whereinn the set time in the PTM 50 is changed from 60 ms to 400 ms. If the knocking occurs before the timer PTM is out, that is within the time of 400 ms, the controller 30 resets the timer flag and the timer PTM 50. In case of no knocking occurrence during the time period of 400 ms, the controller 30 carries out an interrupting routine as shown in FIG. 3D and adopts the retard amount $\theta_{RET}$ set in the step S80. In this case, the retard amount $\theta_{RET}$ is determined by reducing a certain value of ignition timing $\delta$ from the retard amount $\theta_{RET}(n-1)$. This means that the ignition timing is advanced by the value $\delta$ compared to the timing of the retard amount $\theta_{RET}$. As described above, the ignition timing is adapted to be advanced as far as the knocking can be suppressed so that the temperature of the exhaust gas can be maintained as low as possible. However, an excessive advance amount of the ignition timing is undesirable for the engine so that the controller 30 restricts not to advance the ignition timing excessively in step S82 and S84 wherein the controller 30 controls the value of $\theta_{RET}$ to maintain at a positive value. In step S86, the controller 30 provides the PTM 50 with the time period of 400 ms again.

When the interruption occurs by the crank angle signal $C_A$ and there occurs no knocking, the retard amount $\theta_{RET}$ in step S62 is around the slightly advanced value obtained in step S80.

In step 40, in the case where the supercharging pressure is zero and the knocking occurrence is not eliminated, the controller 30 set the retard amount $\theta_{RET}$ within the maximum value $\theta_{KMAX}(6°)$ and carries out a knocking control by only controlling the ignition timing.

In the illustrate embodiment, although the knocking control is made with regard to the ignition timing and the supercharging pressure, the control can be done with regard to the ignition timing, an air fuel ratio A/F or injection pulse, the supercharging pressure, and a compression ratio and a combination thereof. Further, although the maximum retard amount $\theta_{KMAX}$ is set at 6° in the embodiment, any value can be employed for finding out a suitable engine setting as soon as possible taking account of the octane number of the fuel and a misoperation of a knocking sensor. Although the decrements of the maximum value of the retard amount $\theta_{KMAX}$ and the duty ratio $D_{REGi}$ are fixed at a value of 1°, and 25% respectively, they can be variable as far as a substantial torque shock can be suppressed.

A knocking adapter is employed for detecting an occurrence of the knocking in the embodiment. However it is not intended to limit to the embodiment. The knocking occurrence can be detected by counting the number of the vibration based on the knocking using a counter so as to be introduced into the CPU 36.

According to the control as described above in accordance with a specified embodiment, a control time can be shortened for eliminating the knocking occurrence since the supercharging pressure is controlled as well as the ignition timing when a regular gasoline is used.

The supercharging pressure is reduced to eliminate the knocking earlier than a conventional knocking control so that an operation can be shortened under a substantial value of the retard amount to suppress an increase of the exhaust gas temperature as small as possible when a fuel of a middle range octane number larger than the regular gasoline is used.

When the high-octane gasoline is used, an initial value of the maximum retard amount $\theta_{KMAX}$ (step S3) can be set at a big value to eliminating a misoperation of a knocking sensor so that the knocking control can be performed effectively with maintaining a high supercharging pressure.

The invention has thus been shown and described with reference to a specific embodiment, however, it should be noted that the invention is in no way limited to the details of the illustrated embodiment but changes and modifications may be made without departing from the scope of the appended claims.

We claim:

1. A knocking control system for an internal combustion engine comprising knocking detecting means for detecting an occurrence of a knocking, first control means for controlling a combustion in an engine combustion chamber based on signals from the knocking detecting means, first knocking suppressing means for determining a first control gain to control the first control means and thereby suppressing a knocking, second control means for controlling the combustion in the combustion chamber, second knocking suppressing means for determining a second control gain and for controlling the second control means when the first control gain for the first control means is more than a predetermined value, and gain changing means for changing the first control gain to a smaller value as the second control gain is increased.

2. A knocking control system in accordance with claim 1 characterized by the first control means being ignition timing control means for retarding the ignition timing so as to eliminate the knocking.

3. A knocking control system in accordance with claim 2 characterized by the ignition timing control means being adapted to change a retard amount of the ignition timing in accordance with a frequency of occurrence of the knocking.

4. a knocking control system in accordance with claim 1 characterized by the second control means being supercharging pressure control means for reducing a supercharged pressure of intake air so as to eliminate the knocking.

5. A knocking control system in accordance with claim 4 characterized by a decrement of the supercharged pressure of the intake air is constant.

6. A knocking control means in accordance with claim 1 in which the control gain for the second control means is set in accordance with an octane number of a fuel introduced in the engine and an initial value of a control factor in the second control means being set for a high octane number fuel at an engine starting condition.

7. A knocking control system in accordance with claim 1 in which when the knocking control is switched from the first control means to the second control means, the first control means is reset.

8. A knocking control system in accordance with claim 1 in which initial values of control factors for the first and second control means are set at predetermined values under which the knocking is likely to occur at an engine starting condition.

9. A knocking control system in accordance with claim 1 in which when a control factor for the second control means is set at the maximum value, a control factor for the first control means is reset at an initial value which is set at an engine starting condition, and the initial value being the maximum value of the control factor.

10. A knocking control system in accordance with claim 1 further comprising means for detecting no occurrence of the knocking and a control factor for the first control means being reset at the initial value set at an engine starting condition when the knocking occurs.

11. A knocking control system in accordance with claim 10 in which the means being adapted to detect no occurrence of the knocking for a first given period, the control gain in the first control means being controlled to the initial value gradually each time a second given priod expires after the first given period terminates.

* * * * *